United States Patent
MacNab et al.

[15] 3,648,082
[45] Mar. 7, 1972

[54] ROTARY ELECTRICAL MACHINES

[72] Inventors: Robert Beattie MacNab; John Sterry Hawley Ross; Michael Burke Wood, all of Newcastle upon Tyne, England

[73] Assignee: International Research & Development Company Limited, Fossway, Newcastle upon Tyne, England

[22] Filed: June 5, 1970

[21] Appl. No.: 43,693

[30] Foreign Application Priority Data

June 10, 1969  Great Britain......................29,436/69

[52] U.S. Cl..................................................310/10, 310/54
[51] Int. Cl. ..............................................................H02k 9/19
[58] Field of Search ...................................310/10, 40, 52, 54

[56] References Cited

UNITED STATES PATENTS 3,517,231  6/1970  Massar......................................310/52
3,242,418  3/1966  Mela et al. ............................310/52 X

*Primary Examiner*—D. X. Sliney
*Attorney*—Kemon, Palmer & Estabrook

[57] ABSTRACT

A synchronous alternating current machine having a superconducting field winding on a hollow cylindrical portion of a rotor which is joined by hollow frustoconical transition members to supporting stub shafts. The field winding is cooled by cryogenic fluid from a refrigerator, which may be wholly or partly within the rotor, and heat leak into the winding is minimized by the hollow transition members, which are themselves cooled, and a radiation shield mounted on the outside of the rotor.

15 Claims, 4 Drawing Figures

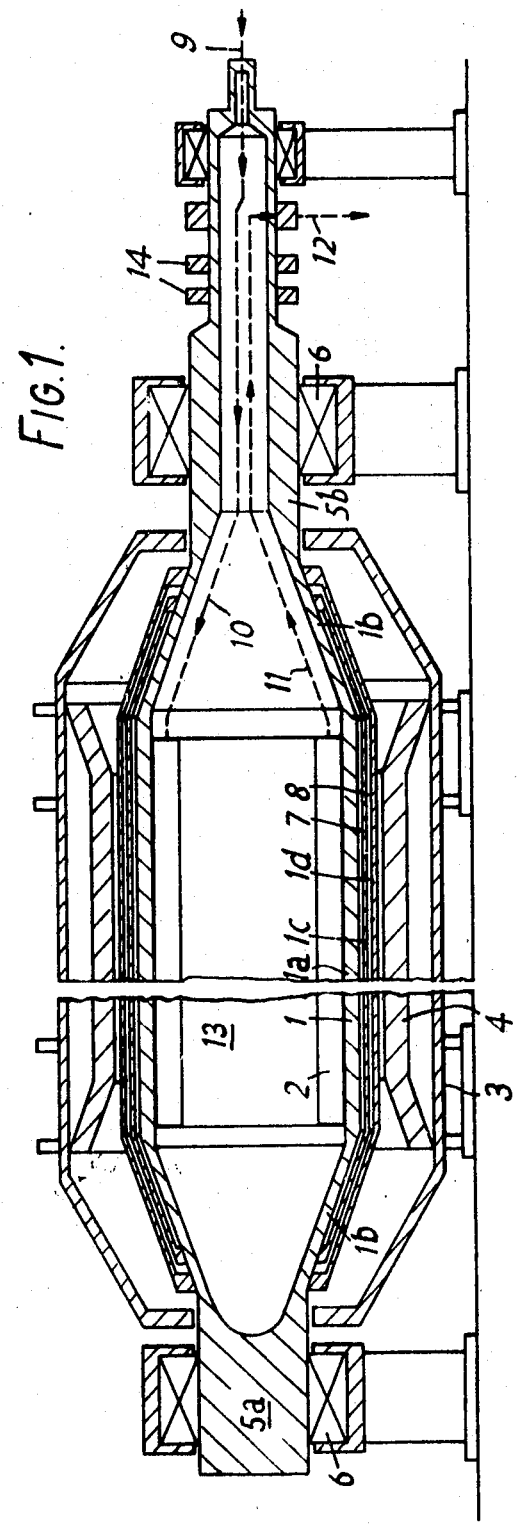

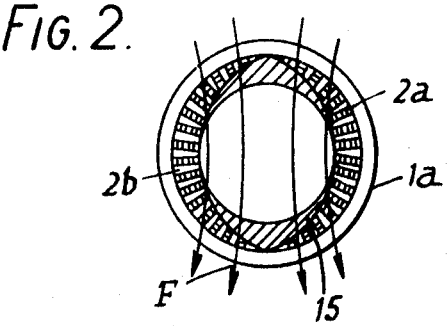
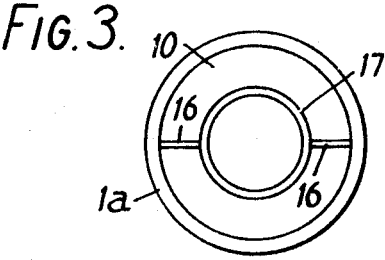
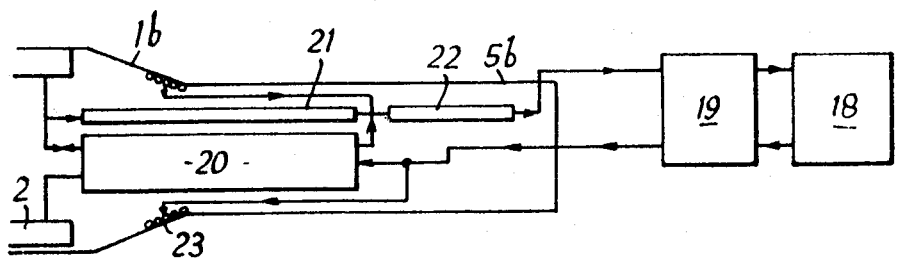

ROTARY ELECTRICAL MACHINES

The present invention relates to rotary electrical machines having superconducting windings.

Following the development of superconducting materials, such as the niobium-titanium and niobium-tin alloys, which remain superconducting in the presence of strong magnetic fields, various proposals have been made for using superconducting windings in rotary electrical machines. The principal line of development has been to use a stationary field winding of superconducting material and a rotor having a nonsuperconducting conductor or winding. This facilitates the cooling of the field winding to the low temperatures necessary for it to exhibit superconductivity while allowing the rotor to operate at ambient temperature. It has been thought that cooling a superconducting winding on a rotor would present very great difficulties because of heat conduction along the shaft of the rotor from the machine to which it is coupled and because of the problems of insulating and refrigerating a rotating body.

The present invention shows how these difficulties can be overcome and thereby allows the construction of a synchronous alternating current machine in which the advantages of superconducting windings can be realized.

In accordance with the invention there is provided a synchronous alternating current machine comprising a rotor having a superconducting direct current winding characterized in that the rotor comprises a hollow cylindrical body of nonmagnetic material supporting the superconducting winding, and hollow transition members of nonmagnetic material connecting the ends of the cylindrical body to rotor shaft portions supported in bearings, means are provided for supplying cryogenic fluid to cool the superconducting winding and the transition members, and at least one radiation shield spaced from the hollow cylindrical body is mounted on the outside of the rotor.

The hollow transition members, which are preferably frustoconical in form, should have the minimum thickness consistent with the required strength in order to minimize heat flow from the rotor shaft portions to the rotor winding. Reinforcing rings or webs can be provided to strengthen the transition members without increasing the heat flow. The transition members are preferably made of a material, such as titanium alloy or stainless steel, which at the very low operating temperature has a low thermal conductivity.

The radiation shield which serves to reduce inflow of radiant heat to the rotor is preferably separated from the hollow cylindrical body by a vacuum space. This vacuum space may be formed by a casing surrounding but spaced from the radiation shield and mounted on the rotor. The radiation shield may be cooled by pipes conveying a cooling medium such as helium at below ambient temperatures.

The superconducting winding can be mounted on the inner surface of the hollow cylindrical member and the hollow rotor can be evacuated to reduce heat flow into the winding.

The superconducting rotor winding may be of conventional field winding form and may be embedded in a material such as epoxy resin. The epoxy resin may be reinforced by a fibrous material such as carbon fiber or glass fiber to provide support for the conductors.

A sinusoidal distribution of radial field around the rotor is preferable and this can be obtained by a sinusoidal distribution of rotor current. Such a current distribution can readily be achieved with the construction described, by distributing the winding so that its radial depth varies around the periphery of the support cylinder. For a two pole machine, for example, there may be two coils diametrically opposite one another and each extending over approximately half the periphery of the support cylinder. The radial depth of each coil would be a maximum where they are furthest apart, tapering to a minimum where the coils are nearest to one another. The arrangement can be modified to suit four-pole or other multipole designs.

In order to ensure uniform loading on the support cylinder, a dummy winding or packing can be used to improve the weight distribution around the support cylinder.

While centrifugal forces can be evenly distributed by using dummy windings or packing or both, nonuniform loading will still be produced by electromagnetic forces which tend to make the support cylinder oval. To counteract this the support cylinder may be reinforced by radial webs extending from a central hub or tubular member.

The superconducting material used for the rotor winding may be in the form of a hollow tube cooled internally or it may be of composite form comprising a multifilament transposed superconductor embedded in a material such as epoxy resin. The conductors may be cooled internally, if hollow, or by means of cooling tubes in or around the winding, or by both methods.

The coolant, which may be helium, may be cooled in a refrigerator outside the rotor body and fed into the winding or at least part of the refrigerator may be located inside the rotor body and be coaxial therewith to minimize centrifugal forces.

The stator may comprise a conventional nonsuperconducting winding, for example, a double layer winding using copper, but because of the intense magnetic fields no magnetic core is needed. The winding could be embedded in epoxy resin supported in a casing but separated therefrom by a magnetic shield, for example, of laminated iron. Alternatively, the casing may also act as the magnetic shield which is necessary to avoid the presence of high magnetic fields outside the machine.

In order that the invention can be more clearly understood it will now be described in one form by way of example with reference to the accompanying drawings in which:

FIG. 1 is a longitudinal section showing in outline only the disposition of the principal parts of a superconducting synchronous AC generator.

FIG. 2 is a section through a rotor winding and support cylinder therefore in accordance with one embodiment of the invention.

FIG. 3 is a cross section through a support cylinder showing a reinforcing web.

FIG. 4 shows in diagrammatic form a typical cooling fluid circuit for the rotor of FIG. 1.

FIG. 1 shows a synchronous AC generator which comprises a rotor 1 supporting a rotor winding 2 and a stator 3 surrounding the rotor and supporting a stator winding 4.

The rotor comprises a support cylinder 1a of nonmagnetic material such as stainless steel, titanium, or material reinforced with carbon fibers, and two hollow conical transition members 1b one at each end of the support cylinder. The members 1b join the support cylinder to rotor shaft portions or stubs 5a and 5b which are supported in bearings 6.

Surrounding the support cylinder 1a and transition members 1b is a radiation shield 1c which is in spaced relation to the support cylinder and transition members except at the ends where it comes into contact with the transition members. Surrounding but spaced from the radiation shield is an outer casing 1d. The shield 1c is preferably of high thermal conductivity material to facilitate cooling and could, for example, be of aluminum alloy. The casing 1d forms a vacuum containment vessel and must be of a material such as aluminum, titanium or stainless steel which has a high strength/weight ratio. The casing 1d is welded to the shaft portions 5a and 5b at each end of the rotor.

The spaces 7 and 8 between the support cylinder and the radiation shield and between the radiation shield and the casing respectively, are under vacuum or at low pressure to reduce heat inflow. Material of low thermal conductivity such as aluminized mylar (R.T.M.) or aluminum and glass fiber may be located in spaces 7 and 8 to reduce heat inflow.

The rotor winding 2 of superconducting material is supported on the inside of the cylinder 1a but details of the winding are not shown for the sake of clarity. It may be embedded in a material such as epoxy resin which hardens to form a bond between the windings and between the windings and the cylinder.

The stator winding is of nonsuperconducting material and can be of conventional form, e.g., a double layer winding, except that, as core iron is not necessary, the winding can be encased in an epoxy resin as in the case of the rotor winding. Again the stator winding has not been shown in detail for the sake of clarity. The diameter of the individual wires in the stator winding must be kept small and in a typical case would be of the order of 1 mm. diameter.

The outer casing of the stator 3 is spaced from the winding 4 and must act as a magnetic shield for the machine because of the high magnetic fields present. One way of achieving this, is for the casing to be made of laminated magnetic material such as iron or mild steel. Alternatively a separate magnetic shield may be located between the casing and the stator winding.

The superconducting rotor winding 2 may be composed of, for example, niobium-titanium or niobium-tin alloys. Such materials have zero resistance, that is they become superconducting, at temperature in the range 10° to 20° K. Whereas some superconducting materials do not retain their superconductivity in the presence of high magnetic fields, these alloys remain superconducting at 5° K. to 10° K. even in the presence of magnetic fields. The winding is maintained at the required low temperature by the circulation of a cryogenic fluid such as supercritical helium gas.

In FIG. 1 the cryogenic fluid is shown diagrammatically as entering at an inlet 9 in the end of the shaft portion 5b and passing by way of ducting 10 to the winding, returning by way of ducting 11 to an outlet 12 in the surface of the shaft portion 5b. The ducting 10 and 11 is disposed in the space 13 within the hollow rotor 1 and the hollow shaft portion 5b. Preferably the space 13 is evacuated to reduce heat leakage into the ducting and the winding. The cryogenic fluid is also applied to cool the transition members 1b so that heat entering by way of the shaft portions 5a and 5b cannot reach the body 1a of the rotor and thence enter the winding. As will be described below with reference to FIG. 4 a separate cooling circuit (not shown in FIG. 1) is preferably provided for the transition members 1b.

Excitation current is fed to the rotor winding through sliprings 14 on the shaft portion 5b and these sliprings operate at normal temperatures.

FIG. 2 is a section through a typical support cylinder and associated rotor winding for a two-pole winding. The winding is arranged in two coils diametrically opposite one another as shown. In order to obtain a sinusoidal current distribution the conductors 2a of the coils are distributed so that the radial depth of the coils varies around the periphery of support cylinder 1a as shown. The radial depth varies from a maximum near the center of each coil to a minimum at the sides of each coil. Such an arrangement leads to a nonuniform distribution of weight within the winding and to obtain a uniform weight distribution a dummy winding or packing 15 may be used. The lines of flux produced by such a winding are shown at F.

The actual form of winding used can be adapted to suit circumstance but it may follow a conventional arrangement such as concentric coil. The whole of the winding is encased in a material 2b such as epoxy resin.

While the centrifugal force can be uniformly distributed in the manner described, the electromagnetic forces can still tend to distort the cylinder. In order to counteract this the support cylinder may be reinforced by webs 16 as shown in FIG. 3. While one web can extend diametrically across the cylinder, a preferred arrangement is to have a central hub or hollow tube 17 from which the webs extend as shown. The use of such a hub helps keep the web thickness to a minimum.

The webs conveniently divide the space 13 into two for a two-pole winding but they could equally well divide the space into four or a larger number of sectors for a four-pole or other form of multipole machine.

Depending on the size of the machine, it may be necessary to carry out the final stage of refrigeration inside the rotor itself to reduce the cryogenic fluid to the temperature necessary to maintain the winding 2 in a superconducting state, in which case a small refrigerating unit could be incorporated in the space 13 in addition to the main refrigerator located outside the machine. Alternatively, the whole or the major portion of the refrigeration cycle may be carried out inside the hollow rotor. In the case where the whole of the cycle is carried out inside the rotor the cryogenic fluid is supplied to the rotor at normal temperatures and several atmospheres pressure, typically 7 atmospheres, and returned from the rotor at near normal temperatures and pressures, typically 1.2 atmospheres.

FIG. 4 shows in diagrammatic form the cooling fluid circuit for an arrangement in which the final stage of refrigeration takes place within the rotor. The cryogenic fluid is compressed in a compressor 18 and then liquefied in a refrigerator 19 in a known manner. It passes from the refrigerator at a temperature of the order of 80° K. and enters the shaft portion 5b of the machine. It then passes to a further refrigerating stage 20 located in the shaft where its temperature is reduced to a value such that it can cool the winding to a temperature at which it becomes superconducting, for example 4° K. It passes from the refrigerator stage 20 to the rotor winding 2 where it circulates through tubes embedded in the winding or through hollow conductors or both. After leaving the winding it is returned to the compressor 18 after being used to precool fluid passing through the refrigerator stage 20.

Part of the fluid leaving the winding bypasses the refrigerator stage 20 and is used in the cooling systems 21 and 22 to cool leads (not shown) carrying excitation current to the winding. In addition some fluid is tapped off from the circuit between the refrigerator 19 and the refrigerator stage 20 and fed to coils 23 which act to cool the transition members 1b at both ends of the rotor and reduce the flow of heat into the support cylinder 1a from the shaft portions 5a and 5b. Such fluid can also be circulated through tubes mounted on the radiation shield 1c (not shown in FIG. 4).

The heat exchangers and refrigerator stage can be mounted in a sleeve in shaft 5 to facilitate removal for maintenance.

We claim:

1. A synchronous alternating current electrical machine comprising a stator, a rotor mounted for rotation within said stator, said rotor comprising a hollow cylindrical body of nonmagnetic material, end shaft portions at the two ends of said cylindrical body, and hollow transition members of nonmagnetic material connecting each end of the cylindrical body to one of said end shaft portions, said transition members being capable of transmitting the running torque of the machine, a superconducting winding supported on said cylindrical body, means for supplying cryogenic fluid to cool said superconducting winding and said transition members, and at least one radiation shield mounted on the outside of said rotor in spaced relation to said cylindrical body.

2. An electrical machine as claimed in claim 1 comprising a magnetic shield forming part of said stator.

3. An electrical machine as claimed in claim 1 in which said transition members are frustoconical.

4. An electrical machine as claimed in claim 1 comprising a casing mounted on the rotor and enclosing a vacuum space, said radiation shield being disposed in the vacuum space.

5. An electrical machine as claimed in claim 4 having pipes for cryogenic fluid disposed on said radiation shield.

6. An electrical machine as claimed in claim 1 wherein said superconducting winding is mounted on the interior of said cylindrical body.

7. An electrical machine as claimed in claim 1 wherein said hollow transition members are evacuated to reduce heat leakage into said rotor.

8. An electrical machine as claimed in claim 1 wherein said hollow cylindrical body and said hollow transition members are evacuated.

9. An electrical machine as claimed in claim 1 wherein the superconducting winding is distributed around the cylindrical body of the rotor with a changing radial depth whereby the current and hence the radial field change sinusoidally around the motor.

10. A machine as claimed in claim 9 having a dummy winding or packing supported on the cylindrical body to produce a uniform distribution of weight around the rotor.

11. A machine as claimed in claim 9 having means reinforcing the cylindrical body against distortion by electromagnetic forces acting on the superconducting winding.

12. A machine as claimed in claim 10 wherein the cylindrical body has a central hollow tubular member and radial webs extending between said tubular member and the body to resist distortion of the body by electromagnetic forces acting on the winding.

13. A machine as claimed in claim 1 wherein the means for supplying cryogenic fluid include a refrigeration stage mounted within the rotor, said refrigeration stage supplying cryogenic fluid to ducts within the superconducting winding.

14. A machine as claimed in claim 13 in which the means for supplying cryogenic fluid also include a compressor and a further refrigeration stage outside the rotor.

15. A machine as claimed in claim 14 having cooling coils on said transition members, said cooling coils being connected to said further refrigeration stage.

* * * * *